(12) United States Patent
Hong et al.

(10) Patent No.: US 10,692,239 B2
(45) Date of Patent: Jun. 23, 2020

(54) OPTICAL TRACKING SYSTEM AND OPTICAL TRACKING METHOD

(71) Applicant: KOH YOUNG TECHNOLOGY INC., Seoul (KR)

(72) Inventors: Deok Hwa Hong, Gwangmyeong-si (KR); In Won Lee, Gwangmyeong-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 192 days.

(21) Appl. No.: 15/852,610

(22) Filed: Dec. 22, 2017

(65) Prior Publication Data
US 2019/0188877 A1 Jun. 20, 2019

(30) Foreign Application Priority Data

Dec. 20, 2017 (KR) .......................... 10-2017-0176503

(51) Int. Cl.
G06K 9/00 (2006.01)
G06T 7/70 (2017.01)
G06T 7/73 (2017.01)

(52) U.S. Cl.
CPC ................. *G06T 7/70* (2017.01); *G06T 7/74* (2017.01); *G06T 2207/30164* (2013.01); *G06T 2207/30204* (2013.01)

(58) Field of Classification Search
CPC ............. G06T 7/70; G06T 2207/30164; G06T 2207/30204
See application file for complete search history.

(56) References Cited

U.S. PATENT DOCUMENTS 10,109,066 B2 * 10/2018 Lee .......................... G06T 7/20
2016/0287341 A1 10/2016 Hong et al.
(Continued)

FOREIGN PATENT DOCUMENTS

EP       3 151 196     4/2017
JP       2008-26236    2/2008
(Continued)

OTHER PUBLICATIONS

You Seong Chae, et al.; "An Image-Based Coordinate Tracking System Using Afocal Optics for Surgical Navigation"; Progress in Optomechatronic Technologies, 2014; pp. 141-152, Lecture Notes in Electrical Engineering vol. 306.
(Continued)

*Primary Examiner* — Shefali D Goradia
(74) *Attorney, Agent, or Firm* — Kile Park Reed & Houtteman PLLC

(57) ABSTRACT

The present disclosure provides an optical tracking system for tracking a location and a posture of a marker. The marker is attachable to a target and configured so that a pattern surface formed inside the marker is visible through an optical system formed in an aperture. The system includes a processor configured to determine the posture of the marker based on a first image in which a part of the pattern surface viewed through the aperture is captured at an infinite focal length, and to determine the location of the marker based on a second image and a third image in which outgoing lights emitted through the aperture in different directions are captured at a focal length shorter than the infinite focal length.

14 Claims, 13 Drawing Sheets

(56) References Cited

U.S. PATENT DOCUMENTS

| | | | |
|---|---|---|---|
| 2017/0193670 A1 | 7/2017 | Lee et al. | |
| 2017/0200278 A1 | 7/2017 | Lee et al. | |
| 2018/0046835 A1 | 2/2018 | Hong et al. | |
| 2019/0183583 A1* | 6/2019 | Hong | G06T 7/74 |

FOREIGN PATENT DOCUMENTS

| | | |
|---|---|---|
| JP | 2008-216089 | 9/2008 |
| JP | 2016-516526 | 6/2016 |
| JP | 2016-184956 | 10/2016 |
| JP | 2017-522674 | 8/2017 |
| JP | 2017-525937 | 9/2017 |
| JP | 2018-25531 | 2/2018 |

OTHER PUBLICATIONS

Supplementary European Search Report for European Application No. EP 17 21 0446, dated May 2, 2018.
Korean Office Action with English translation for Korean Application No. 10-2017-0176503, dated Aug. 27, 2019.
European Office Action, corresponding to European Application No. 17 210 446.5, dated Jan. 29, 2020.
Korean Office Action, with English translation, corresponding to Korean Application No. 10-2017-0176503, dated Mar. 23, 2020.

* cited by examiner

FIG. 6
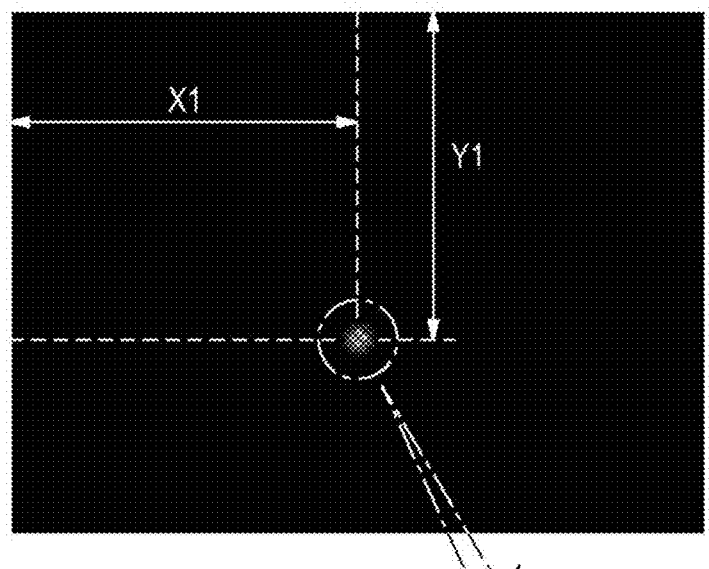
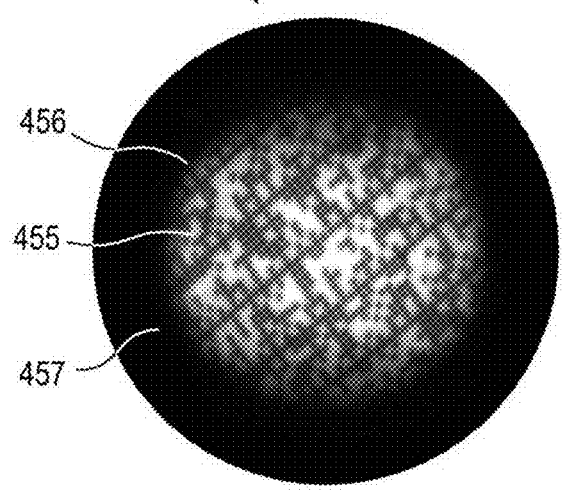

FIG. 13

Determining a posture of a marker based on a first image in which a part of a pattern surface viewed through an aperture is captured as a pattern image at an infinite focal length — S1210

Determining a location of the marker based on second and third images in which outgoing lights emitted in different directions through the aperture are captured as outgoing light images at a focal length shorter than the infinite focal length — S1220

Determining a location of the pattern image included in the first image in an entire region of the pattern surface — S1211

Determining a posture of a target based on the location of the pattern image thus determined — S1212

S1210

OPTICAL TRACKING SYSTEM AND OPTICAL TRACKING METHOD

CROSS-REFERENCE TO RELATED APPLICATIONS

This application is based upon and claims the benefit of priority from Korean Patent Application No. 10-2017-0176503 filed on Dec. 20, 2017, the entire subject matter of which is incorporated herein by reference.

TECHNICAL FIELD

The present disclosure relates to an optical tracking system and an optical tracking method.

The present disclosure is derived from research conducted as a part of the Robot Industry Fusion Core Technology Development Project of the Ministry of Trade, Industry and Energy. [Project No. 10062800, Project Title: Development of Practical Technology of Medical Imaging based Brain Surgery Robot System through Clinical Trial]

BACKGROUND

An optical tracking system may be used for tracking a target. Recently, in order to perform precise surgery while minimizing a risk of the surgical errors, a method has been used that tracks the location (or coordinates) and the posture (or orientation) of a surgical robot or a surgical instrument and utilizes the tracking result for surgery. The location of a target, for example, may be defined as spatial coordinates, such as coordinates on the X, Y, and Z axes of an orthogonal coordinate system. The posture of a target may be defined as a roll, pitch, or yaw. In order to accurately track a target, it is important to accurately recognize the location and the posture of the target, which correspond to six degrees of freedom as described above.

In the optical tracking system, for example, after attaching a reference body, such as a marker, to the target, the marker is tracked in order to determine the location and the posture of the target. The optical tracking system goes through, for example, a process in which a part of the marker is imaged using an image capturing device such as a camera or the like, and the image is read. In this process, a part of the captured image (for example, a boundary portion) may appear blurred or unclear due to various factors. When the marker is tracked based on such an image, there may be generated a difference between the estimated location and posture of the target and the actual location and posture of the target.

SUMMARY

An embodiment of the present disclosure provides an optical tracking system and an optical tracking method capable of accurately measuring the location and posture of a target. For example, an embodiment of the present disclosure may provide an optical tracking system and an optical tracking method capable of capturing three images of a marker and measuring a location and a posture of a target based on the three image thus captured.

According to one aspect of the present disclosure, there is provided an optical tracking system for tracking a location and a posture of a marker which is attachable to a target and configured so that a pattern surface formed inside the marker is visible through an optical system formed in an aperture, including: a processor configured to determine the posture of the marker based on a first image in which a part of the pattern surface viewed through the aperture is captured at an infinite focal length, and to determine the location of the marker based on a second image and a third image in which outgoing lights emitted through the aperture in different directions are captured at a focal length shorter than the infinite focal length.

In one embodiment, the processor may include: a posture tracking part configured to determine the posture of the marker based on the first image in which the part of the pattern surface visible through the aperture is captured at the infinite focal length; and a location tracking part configured to determine the location of the marker based on the second and third images in which the outgoing lights emitted through the aperture in different directions are respectively captured at the focal length shorter than the infinite focal length.

In one embodiment, the first image may include a pattern image captured at the infinite focal length so that a part of the pattern surface is identifiably captured in the pattern image, and the second and third images may respectively include outgoing light images captured at a focal length of a predetermined range including a location of the target so that outgoing lights directed in different directions are captured in the outgoing light images.

In one embodiment, the posture tracking part may be configured to determine a location of the pattern image from an entire region of the pattern surface and to determine a posture of the target based on the location of the determined pattern image.

In one embodiment, the location tracking part may be configured to determine reference coordinates of the outgoing light images captured in the second and third images and to determine a location of the target based on the determined reference coordinates.

In one embodiment, the location tracking part may be configured to determine the location of the marker on a three-dimensional space based on a disparity between the reference coordinates of the outgoing light images captured in the second and third images.

In one embodiment, the system may further include: a first image capturing part formed of a light field camera for generating a light field image, wherein the first image capturing part may be configured to extract the first image captured at the infinite focal length from the light field image so as to include a pattern image.

In one embodiment, the first image capturing part may be configured to extract a fourth image captured at the focal length shorter than the infinite focal length from the light field image so as to include an outgoing light image, and the processor may be configured to determine the location of the marker based on the second image, the third image and the fourth image.

According to another aspect of the present disclosure, there is provided an optical tracking system for tracking a location and a posture of a marker which is attachable to a target and configured so that a pattern surface formed inside the marker is visible through an optical system formed in an aperture, including: a first image capturing part configured to capture a first image including a part of the pattern surface at an infinite focal length; a second image capturing part configured to capture a second image including an outgoing light image of an outgoing light emitted through the aperture in a first direction at a focal length shorter than the infinite focal length; a third image capturing part configured to capture a third image including an outgoing light image of an outgoing light emitted through the aperture in a second direction differing from the first direction at the focal length shorter than the infinite focal length; and a processor configured to determine the posture of the marker based on the first image and to determine the location of the marker based on the second image and the third image.

In one embodiment, each of the first image capturing part and the second image capturing part may be formed of a light field camera for generating a light field image, the first image capturing part may be configured to extract a fourth image captured at the focal length shorter than the infinite focal length from the light field image, the second image capturing part may be configured to extract a second image captured at the focal length shorter than the infinite focal length from the light field image, and the processor may be configured to determine the location of the marker based on the second image, the third image and the fourth image.

In one embodiment, the first image capturing part may be disposed at a height different from a height of the second and third image capturing parts from a ground surface and may be disposed between the second and third image capturing parts in a direction in a plan view.

According to a further aspect of the present disclosure, there is provided an optical tracking method for tracking a location and a posture of a marker which is attachable to a target and configured so that a pattern surface formed inside the marker is visible through an optical system formed in an aperture, including: determining the posture of the marker based on a first image in which a part of the pattern surface viewed through the aperture is captured as a pattern image at an infinite focal length; and determining the location of the marker based on a second image and a third image in which outgoing lights emitted through the aperture in different directions are captured as outgoing light images at a focal length shorter than the infinite focal length.

In one embodiment, the determining the posture of the marker may include: determining a location of the pattern image included in the first image in an entire region of the pattern surface; and determining a posture of the target based on the location of the pattern image thus determined.

In one embodiment, the determining the location of the marker may include: determining reference coordinates of the outgoing light images captured in the second and third images; and determining a location of the target based on the reference coordinates thus determined and a geometrical relationship between the directions in which the outgoing lights are directed.

In one embodiment, the method may further include: generating a light field image including the part of the pattern surface viewed through the aperture; extracting the first image captured at the infinite focal length from the light field image so as to include the pattern image, and extracting a fourth image captured at the focal length shorter than the infinite focal length from the light field image so as to include an outgoing light image; and determining the location of the marker based on the second image, the third image and the fourth image.

According to the embodiments of the present disclosure, it is possible to simultaneously track a posture and a location of a marker attached to a target.

In addition, it is possible to improve the tracking accuracy of a posture and a location of a marker and to improve the precision of the optical tracking system.

BRIEF DESCRIPTION OF THE DRAWINGS

Embodiments of the inventive aspects of this disclosure will be understood with reference to the following detailed description, when read in conjunction with the accompanying drawings.

FIG. 6 is a view for illustrating an exemplary shape of a first image captured by a first image capturing part shown in FIG. 5.

FIG. 13 is a flowchart showing an optical tracking method according to another embodiment of the present disclosure.

FIG. 14 is a flowchart showing a step of determining a posture of a marker in the optical tracking method shown in FIG. 13.

DETAILED DESCRIPTION

Figure 1:
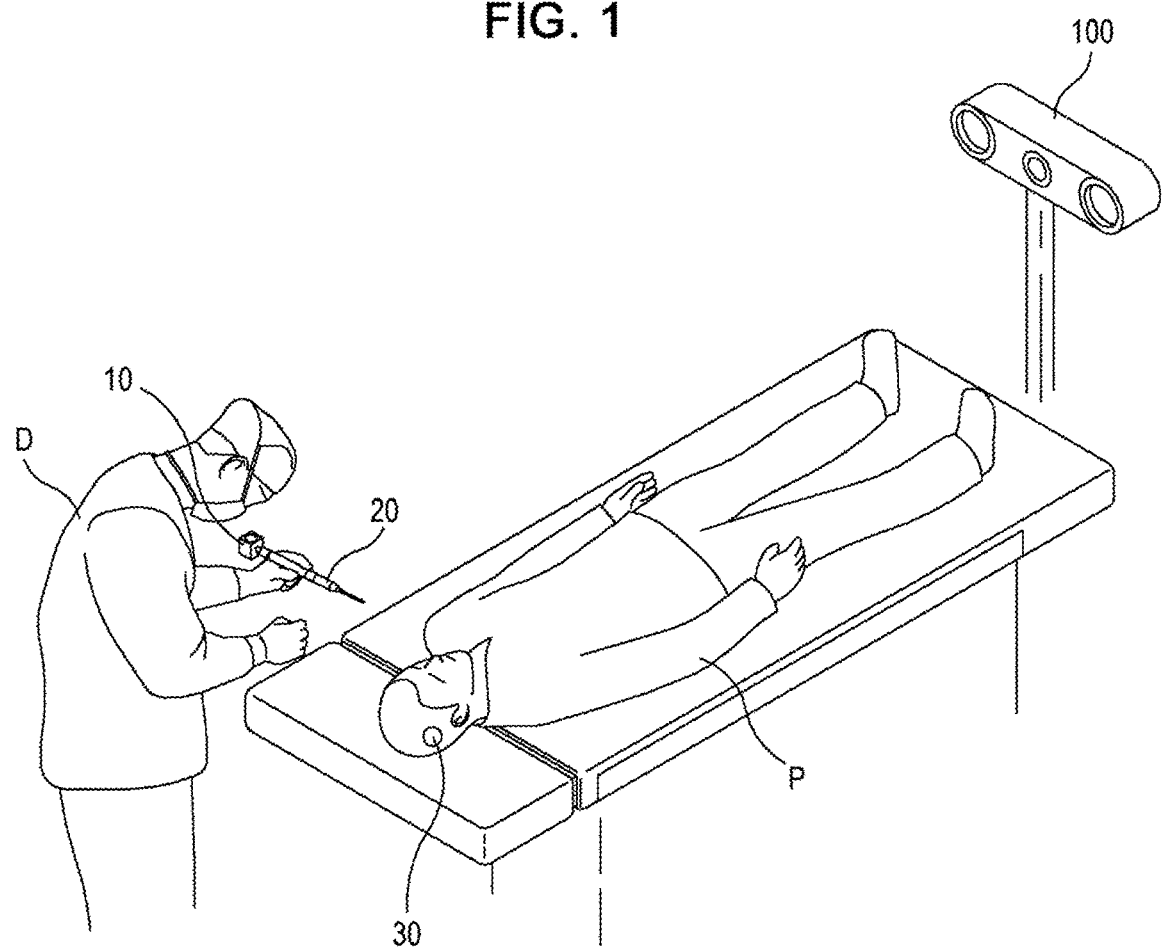
FIG. 1 is a view showing an example in which an optical tracking system is used for surgery according to an embodiment of the present disclosure.

Embodiments of the present disclosure are only examples that are illustrated for the purpose of explaining the present disclosure. The embodiments of the present disclosure may be conducted in various manners, and the present disclosure shall not be construed to be limited to the embodiments described below or to the detailed description of the embodiments.

The term "part" used in the present disclosure may refer to a software element or a hardware element, such as FPGA (field-programmable gate array), ASIC (application specific integrated circuit), etc. The "part" is not limited to hardware and software. The "part" may be configured to be in a storage medium that can be addressed, and may be configured to reproduce one or more processors. Accordingly, as an example, the "part" includes elements, such as software elements, object-oriented software elements, class elements, task elements, etc., processors, functions, attributes, procedures, subroutines, program code segments, drivers, firmware, micro-codes, circuits, data, databases, data structures, tables, arrays, and variables. Functions that are provided in the elements and "part" may be combined into fewer elements and "parts," or may be further divided into additional elements and "parts."

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

The expressions, such as "include" or "have," which are used in the present disclosure, should be appreciated as open-ended terms that include a possibility of including other embodiments unless particularly otherwise stated in the phrase or sentence that contains the corresponding expressions.

In the present disclosure, the expression "based on" will be used to describe one or more factors that affect an act or operation of a decision or determination that is described in the phrase that contains the corresponding expression, and does not exclude additional factors that affect the act or operation of the decision or determination.

In the present disclosure, the description that one element is "connected," or "coupled" to another element should be appreciated to indicate that one element may be directly connected, or coupled, to another element, and should be further understood that a new element may be interposed between one element and another element.

Hereinafter, the embodiments of the present disclosure will be described in detail with reference to the accompanying drawings. The same reference numeral will be used for the same element throughout the drawings, and a duplicate description of the same element will be omitted.

<Optical Tracking System>

FIG. 1 is a view showing an example in which an optical tracking system 1 according to an embodiment of the present disclosure is used for surgery.

As shown, a doctor D may proceed with surgery for a patient P by using a surgical instrument 20 and the optical tracking system 1 which includes an image capturing device 100. A marker 10 may be attached to the surgical instrument 20 that is used by the doctor D, and another marker 30 may be attached to a target, such as an affected portion of the patient P. The image capturing device 100 of the optical tracking system 1 may capture and obtain a pattern image for the whole pattern or a part of a pattern formed on the marker 10 and/or 30. The pattern image may be captured in a partial region in a frame of an image that is outputted by an image sensor included in an image capturing part of the image capturing device 100.

When the pattern image is obtained, one or more sub-patterns may be extracted from the pattern image as a basic unit constituting the pattern of the marker. In some embodiments, locations of the one or more extracted sub-patterns in the entire pattern may be determined, and the posture of the marker 10 and/or 30 may be determined based on the determined locations of the sub-patterns in the entire pattern. In this case, the posture of the marker 10 and/or 30 may be referred to a relative three-dimensional direction or orientation of the marker 10 and/or 30 with respect to the image capturing device 100.

In one embodiment, the image capturing device 100 may include three image capturing parts, each of which may be, for example, a camera capable of capturing an image for at least a part of the marker 10 and/or 30. Specifically, each of the image capturing parts may capture an image from, for example, the light that goes from an aperture of the marker 10 and/or 30 to each of the image capturing parts.

The location of one marker 10 and/or 30 may be determined using triangulation based on two images having a stereoscopic relationship among the three images captured by three cameras.

When the location and the posture of the marker 10 and/or 30 are obtained as described above, the location and the posture of a target to which the marker 10 and/or 30 is attached may be determined based on a geometrical relationship between the marker 10 and/or 30 and the target to which the marker 10 and/or 30 is attached.

As will be described in detail below, according to the optical tracking system 1 according to an embodiment of the present disclosure, the location and the posture of the target corresponding to six degrees of freedom may be determined by using at least one marker.

According to the optical tracking system 1 of the present disclosure, even when one marker 10 is attached to the surgical instrument 20 as a target, the location and the posture of the target may be tracked based on a pattern formed on the marker 10. Therefore, a light or small marker 10 may be attached to the surgical instrument 20, and the doctor D may proceed with surgery by using the surgical instrument 20 having the marker attached thereto without concerning about a size or weight of the marker 10.

Although the marker and the optical tracking system 1 according to the present disclosure are used in the surgery of a patient by a doctor in the embodiments described above, they may also be used in various other instances for determining the location and the posture of a target by using a marker. For example, the marker and the optical tracking system, according to the present disclosure, may be used for determining the location and the posture of a surgical instrument that is attached to a surgical robot when a patient undergoes surgery using the surgical robot. In another example, the marker and the optical tracking system, according to the present disclosure, may be used for determining the location and the posture of a specific instrument and/or target when a specific operation is performed with respect to the target using the instrument by an operator or surgical robot. Various embodiments of the marker and the optical tracking system of the present disclosure, which have been described through the examples of FIGS. 1 and 2, will be described in more detail below.

Figure 2:
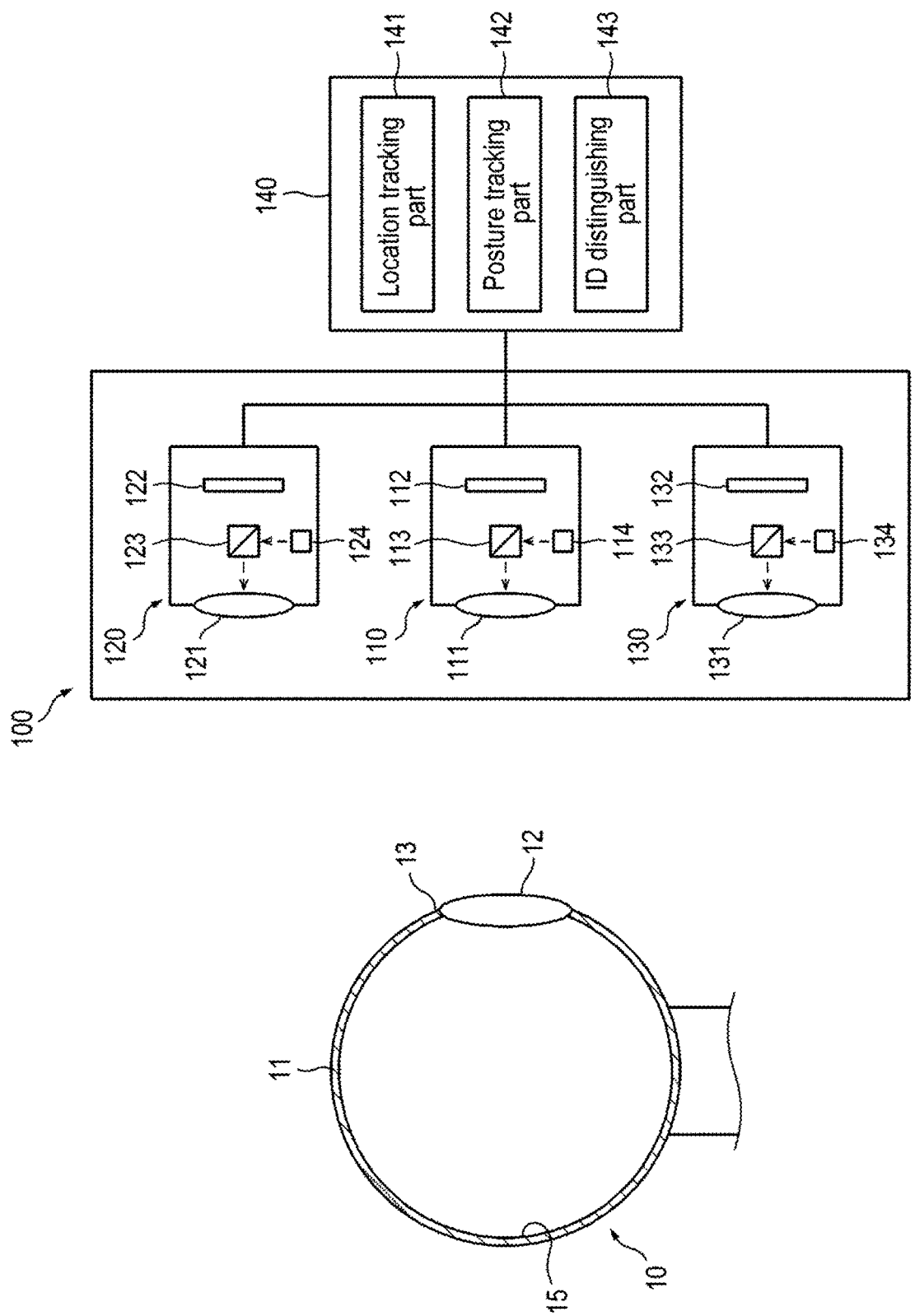
FIG. 2 is a block diagram of an optical tracking system according to an embodiment of the present disclosure.

FIG. 2 depicts a block diagram of the optical tracking system 1 according to an embodiment of the present disclosure.

In the optical tracking system 1, an image capturing device 100 may capture a plurality of images including a part of the marker 10, and a processor 140 may receive the plurality of images from the image capturing device 100 and may track the location and the posture of the marker 10 based on the plurality of images.

In one embodiment, the marker 10 may include a pattern surface 15 on which a pattern is formed, and an optical system 12, such as lenses or the like, which is configured to allow at least a part of the pattern, which uniquely appears depending on a viewing direction from the outside of the marker, to be identified (or visually recognized) from the outside of the marker 10.

The contour 11 of the marker 10 may have a shape that facilitates the installation of the pattern surface 15 and the optical system 12 such as a lens or the like. For example, the contour 11 of the marker 10 may have a curved shape as a whole. In this case, the pattern surface 15 on which a pattern is formed may be embodied on at least a part of the inner or outer surface having a curved shape. The optical system 12 may be embodied in an aperture 13 opposite to the pattern surface 15 on the inner surface having a curved shape and may have, for example, a curved shape. In another embodiment, the contour 11 of the marker 10 may have a hexahedral or cylindrical shape. When the contour 11 of the marker 10 has a cylindrical shape, the optical system 12 may be provided in the aperture 13 formed on one end portion of the cylindrical shape, and the pattern surface 15 may be provided in the other end portion opposite to one end portion. In this configuration, the pattern formed on the pattern surface 15 may be visually recognized from the outside through the optical system 12.

In one embodiment, when the marker 10 is located within the field of view of the image capturing device 100 and the optical system 12 is arranged to face the image capturing device 100, the image capturing device 100 may capture at least a part of the pattern surface 15 identified through the optical system 12 positioned in the aperture 13.

In one embodiment, the image capturing device 100 may include first to third image capturing parts 110, 120 and 130 which are operating in parallel with one another. One of the first to third image capturing parts 110, 120 and 130 (for example, the first image capturing part 110) may capture an image of at least a part of the pattern surface 15 of the marker 10, and each of the remaining two image capturing parts (for example, the second and third image capturing parts 120 and 130) may capture an outgoing light coming from the aperture 13 of the marker 10. In addition, the first to third image capturing parts 110, 120 and 130 may have a configuration of a coaxial illumination camera.

The optical system of the first image capturing part 110 may constitute an infinite optical system together with the optical system 12 formed in the aperture 13 of the marker 10. Furthermore, the optical system of the first image capturing part 110 may form a focal point at an infinite focal length. Accordingly, the first image capturing part 110 may capture an image including a part of the pattern surface 15 visible through the aperture 13 of the marker 10. The optical system of each of the second and third image capturing parts 120 and 130 may form a focal point at a focal length shorter than the infinite focal length. Thus, the second and third image capturing parts 120 and 130 may capture an image of the outgoing light emitted from the aperture 13 of the marker 10.

The infinite focal length may mean, for example, a length corresponding to a position considerably far away from the marker 10 with respect to the image capturing device 100. Furthermore, the focal length shorter than the infinite focal length (hereinafter referred to as "short focal length") may mean a focal length of a predetermined range including the location of a target. Since the marker 10 is attached to a target, the focal length shorter than the infinite focal length may be a focal length of a predetermined range including the location of the marker 10.

In one embodiment, each of the first to third image capturing parts 110, 120 and 130 may be oriented in different directions toward the marker 10. The first image capturing part 110 may be disposed between the second and third image capturing parts 120 and 130 with respect to the direction facing the ground. In addition, the second and third image capturing parts 120 and 130 may be arranged in a horizontal (parallel) manner or an intersecting (converging) manner so as to have a stereoscopic relationship.

In one embodiment, each of the first to third image capturing parts 110, 120 and 130 may capture one image and may have, for example, a structure like a digital camera. The first to third image capturing parts 110, 120 and 130 may include lenses 111, 121 and 131 and image sensors 112, 122 and 132, respectively. Each of the image sensors 112, 122 and 132 may capture the light coming from the corresponding lens 111, 121 or 131 into one image.

In one embodiment, the lenses 111, 121 and 131 may condense the light coming from the marker. Each of the lenses 111, 121 and 131 may be a convex lens having one focal length so that the light coming from the marker is condensed at one point. When each of the lenses 111, 121 and 131 is implemented using a plurality of lenses or the like, a plurality of lenses may be defined as a single thin lens according to a well-known thin lens theory. Accordingly, the diameter, the focal length and the center of each of the lenses 111, 121 and 131 may be represented by the diameter, the focal length and the center of one thin lens thus defined.

In one embodiment, each of the image sensors 112, 122 and 132 may sense the light that has passed through the lens and may acquire one image. Each of the image sensors 112, 122 and 132 may include at least one image capturing element of an arbitrary type configured to acquire a captured image of an arbitrary object and may include, for example, a Charge Coupled Device (CCD) sensor or a Complementary Metal-Oxide Semiconductor (CMOS) sensor. In addition, each of the image sensors 112, 122 and 132 may include a plurality of pixels.

In one embodiment, each of the first to third image capturing parts 110, 120 and 130 may include at least one light source 114, 124 or 134 that irradiates light toward the marker 10 or the pattern in order to enhance the light incident on the image capturing device 100 through the optical system 12 so that the pattern surface 15 can be well identified outside the marker 10. In this case, the marker 10 may operate as a passive marker. Each of the first to third image capturing parts 110, 120 and 130 may include a beam splitter 113, 123 or 133 that irradiates the light generated from the light source 114, 124 or 134 toward the marker 10 through the lens 111, 121 or 131.

In FIG. 2, the light sources 114, 124 and 134 are disposed inside the first to third image capturing parts 110, 120 and 130. However, the present disclosure is not limited thereto. The light sources 114, 124 and 134 may be disposed outside the image capturing device 100. According to another embodiment, the light sources may be installed inside the marker 10 so as to irradiate light toward the front or back surface of the pattern surface 15. In this case, the marker 10 may operate as an active marker.

In one embodiment, when the optical tracking system 1 is operating within a surgical system such as a surgical navigation system or the like, the marker 10 may be attached to at least one target including a surgical tool, a portion of a surgical robot or an affected portion of a patient. When a plurality of markers is used, the locations and the postures of the markers may be tracked sequentially or simultaneously.

In one embodiment, the processor 140 may include a posture tracking part 142 for determining the posture of the marker 10 based on a first image obtained by capturing a part of the pattern surface 15 viewed through the aperture 13 at an infinite focal length, a location tracking part 141 for determining the location of the marker 10 based on second and third images respectively obtained by capturing the outgoing lights emitted through the aperture 13 in different directions at a short focal length, and an ID distinguishing part 143 for distinguishing the markers attached to the respective targets through the IDs of the markers to track the locations and the postures of the markers. The ID distinguishing part 143 may distinguish the ID of the marker 10 from the pattern image included in the first image.

According to a further embodiment, the optical tracking system 1 may track the locations and the postures of two markers having a predetermined geometrical relationship. For example, the optical tracking system 1 may simultaneously track the locations and postures of the marker 10 attached to the surgical instrument 20 shown in FIG. 1 and the marker 30 attached to the head of a patient. The optical tracking system may obtain pattern images of patterns formed on two markers, respectively, through the image capturing device. The locations of two markers may be determined based on the predetermined geometrical relationship and a relationship between the location of at least a part of the pattern on the pattern image and the location of at least the corresponding part of the pattern on each of the markers. The postures of the markers may be determined in the same manner as described above.

In one embodiment, the marker 10 may be attached to a target whose location and posture are measured by the optical tracking system 1, or may be implemented as the entirety or a part of the target. By measuring the location and posture of the marker 10, the location and posture of the target to which the marker 10 is attached may be measured. In addition, the marker 10 and the target may have a predetermined geometrical relationship.

Figure 3:
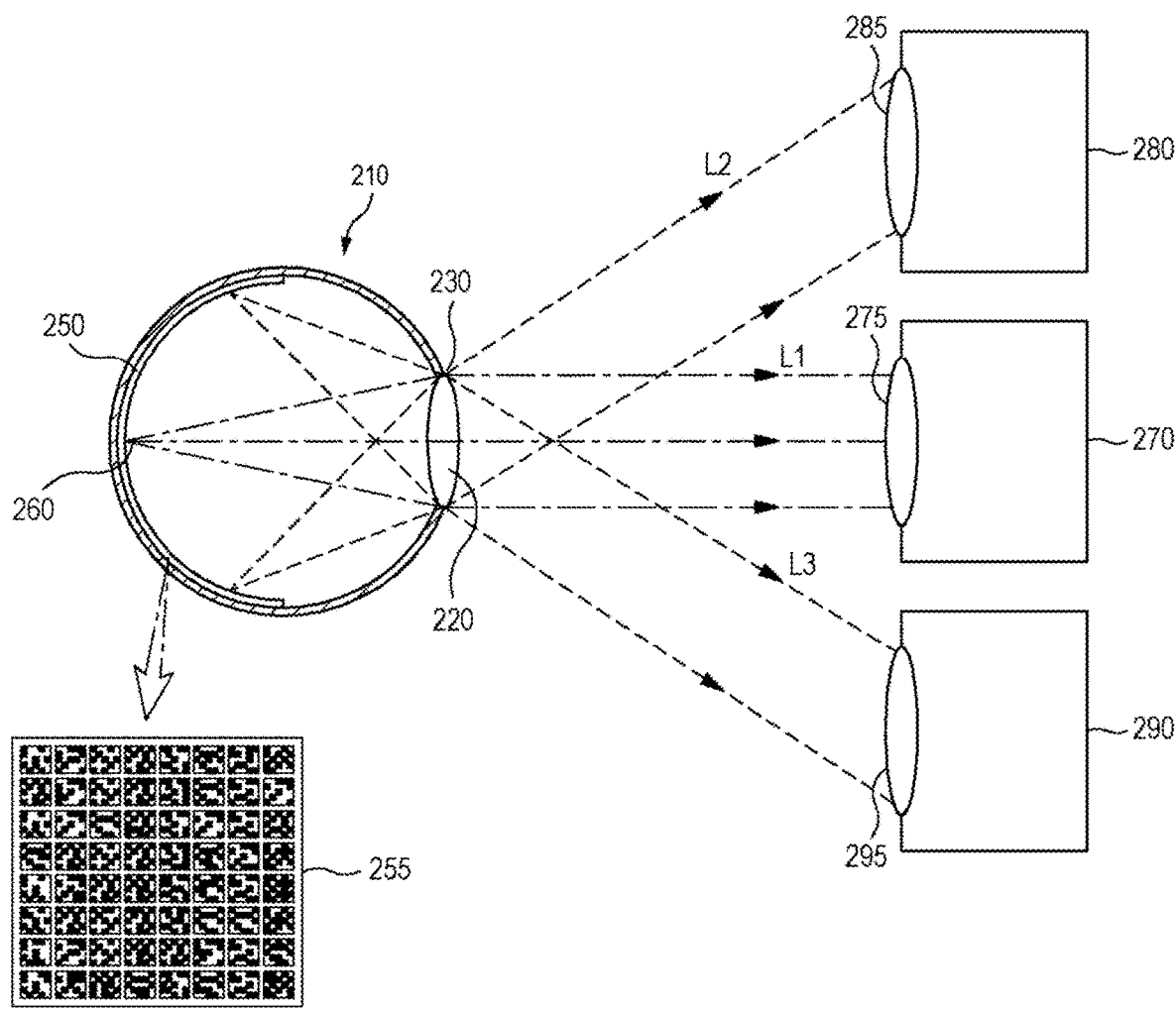
FIG. 3 is a view showing an example in which the reflection light emitted from an aperture of a marker is captured by an image capturing part in different directions in accordance with an embodiment of the present disclosure.

FIG. 3 is a view illustrating an example in which the reflection light emitted from the aperture of the marker is captured by the image capturing parts in different directions according to an embodiment of the present disclosure.

In one embodiment, the first image capturing part 270 may form an infinite optical system together with the marker 210. The pattern surface 250 on which a pattern 255 is formed may be disposed inside the marker 210 such that a pattern image is transferred to the first image capturing part 270 through the optical system 220 in the form of the outgoing light L1. The depth of field of the image sensor included in the first image capturing part 270 may be set so as to encompass a predetermined finite range at a point farther than the location of the marker 210 or at an infinite point so that a pattern image is formed by the optical system 220 of the marker 210. In this case, the image sensor included in the first image capturing part 270 may capture a pattern image on a part of the pattern formed in the marker 210, regardless of whether the distance from the marker 210 is changed in response to the movement of the marker 210. In addition, the first image capturing part 270 may capture the pattern image without adjusting the depth of field or the magnification even when the marker moves away from or comes close to the first image capturing part 270. Therefore, if the infinite optical system is configured as described above, at least a part of the pattern may be identified from the pattern image captured by the first image capturing part 270, regardless of how far the marker 210 is located away from the image capturing device. In another embodiment, when the pattern surface 250 is disposed inside the marker 210, the optical system 220 of the marker 210 may constitute an infinite optical system together with the optical system lenses 275 and 285 of the first and second image capturing parts 270 and 280.

In one embodiment, the second and third image capturing parts 280 and 290 may capture a second image and a third image using the outgoing lights emitted through the aperture 230 of the marker 210 in different directions. That is to say, the light L2 and L3 reflected from the marker 210 may pass through the lenses 285 and 295 of the second and third image capturing parts 280 and 290 and may be captured by the image sensors included in the second and third image capturing parts 280 and 290. The lenses 285 and 295 of the second and third image capturing parts 280 and 290 and the optical system 220 of the marker 210 may not form an infinite optical system. In this case, the pattern may not be captured in a readable form. The lenses 285 and 295 of the second and third image capturing parts 280 and 290 may form focal points in front of the second and third image capturing parts 280 and 280 in order to capture the outgoing light emitted from the aperture 230. Thus, the position of the outgoing light captured in the second and third images may be clearly identified.

In one embodiment, the pattern 255 is formed such that the location of each of the sub-patterns is uniquely determined throughout the entire pattern. Therefore, the information on the location of each sub-pattern in the entire pattern may be extracted from the pattern image of the pattern. Specifically, the pattern 255 may include aperiodic sequences that are repeatedly arranged. For example, each aperiodic sequence may be a Pseudo-Random Binary Sequence (PRBS), and more specifically, may be a De Bruijn Sequence. In this case, the "aperiodic sequence," as described above, may mean that it has a maximized auto-correlativity or a plurality of sub-sequences included in the corresponding sequence is not arranged in a periodic manner. In addition, the pattern 255 may be formed so as to provide the ID of the marker.

Figure 4:
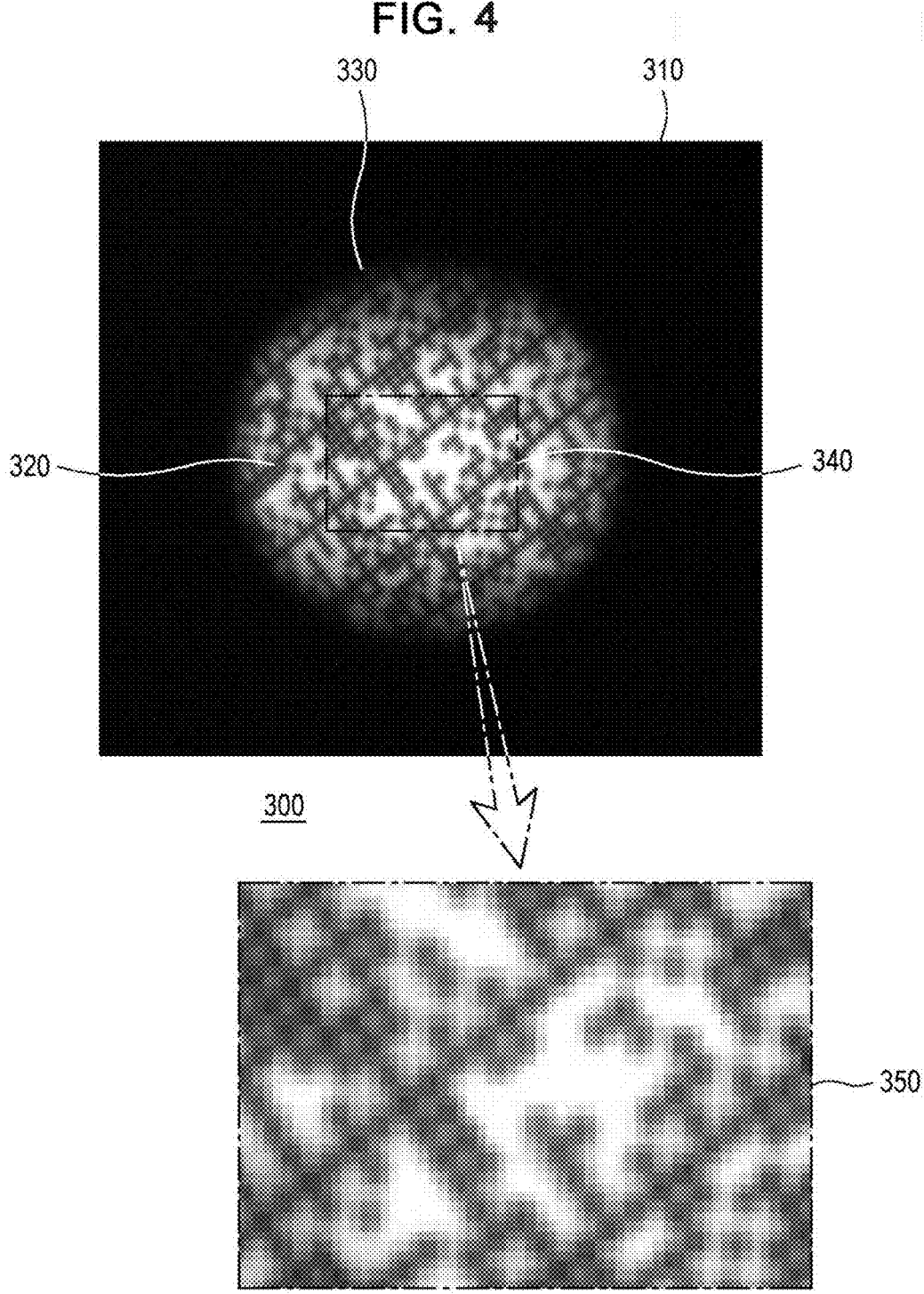
FIG. 4 is a view for illustrating a corrected image obtained by image-processing an image captured in an image capturing part in accordance with an embodiment of the present disclosure.

FIG. 4 is a view for illustrating a corrected image 300 obtained by image-processing an image captured in the image capturing part in accordance with an embodiment of the present disclosure.

In one embodiment, the image capturing part may capture an image of at least a part of the pattern formed on the marker to determine the location and the posture of a target (for example, a surgical instrument) to which the marker is attached. There may be a predetermined geometrical relationship between the marker and the target. When the posture of the marker is tracked, the posture of the target may be tracked using the predetermined geometrical relationship with the target.

The image capturing part constituting the infinite optical system together with the marker may acquire a corrected image 300 by subjecting an original image (not shown) actually captured by the image sensor to predetermined image processing. The original image (not shown) is such that the periphery around the pattern portion is not completely dark and the objects located at the field of view of the image capturing device are blurred. The image processing may be, for example, an operation by which the difference between bright and dark portions in the captured image is enhanced.

In one embodiment, the corrected image 300 may include a pattern image 320 formed at a predetermined location. An imaginary boundary portion 330 surrounding the pattern image 320 may correspond to the location of the aperture of the marker and may distinguish the pattern image 320 and the peripheral portion 310. A sub-pattern 350 included in the pattern image 320 may be read through a pattern window 340 in a posture determination part of the processor. After the original image (not shown) is subjected to the image processing, the pattern image 320 becomes prominent just like the corrected image 300 shown in FIG. 4. The peripheral portion 310 becomes dark, and the boundary portion 330 is blurred.

The peripheral portion 310 of the corrected image 300 excluding the pattern image 320 is a portion that is relatively darker than the pattern surface of the marker corresponding to the pattern image 320 and may be captured in a imageless state (for example, a black-out state). That is, the image sensor of the image capturing device darkens the area having not depth of field and the area having a relatively small light amount. The darkened area may become the peripheral portion 310. In addition, the image sensor of the image capturing part constituting the infinite optical system together with the optical system of the marker has a depth of field set to a long distance or an infinite distance, whereby all the objects existing in a short distance falling within a marker operation range may be severely blurred. Moreover, the pattern image 320 may be strongly prominent within the corrected image 300 because the outgoing light emitted from the aperture of the marker is relatively bright compared with the ambient light. If the light used for capturing the image of the marker is controlled through illumination and filtering, the difference in brightness between the pattern image 320 and the peripheral portion 310 may be larger in the corrected image 300.

In one embodiment, when the image capturing part of the optical tracking system captures the pattern image 320 using the outgoing light reflected from the pattern surface formed on the marker, the posture determination part of the processor may determine the posture of the marker based on the location in the entire pattern of each sub-pattern 350 included in the pattern image 320. For example, a part of the pattern 255 shown in FIG. 3 may be included in the captured pattern image 320. The processor may receive the corrected image 300 from the image capturing part and may identify the sub-pattern 350 through a pattern window 340 in the read pattern image 320. The size of the pattern window 340 may be equal to or greater than the size of the sub-pattern 350. That is, the posture tracking part of the processor may determine the location of the corresponding sub-pattern in the entire pattern and may determine the posture of the marker based on the location of the sub-pattern thus determined.

Figure 5:
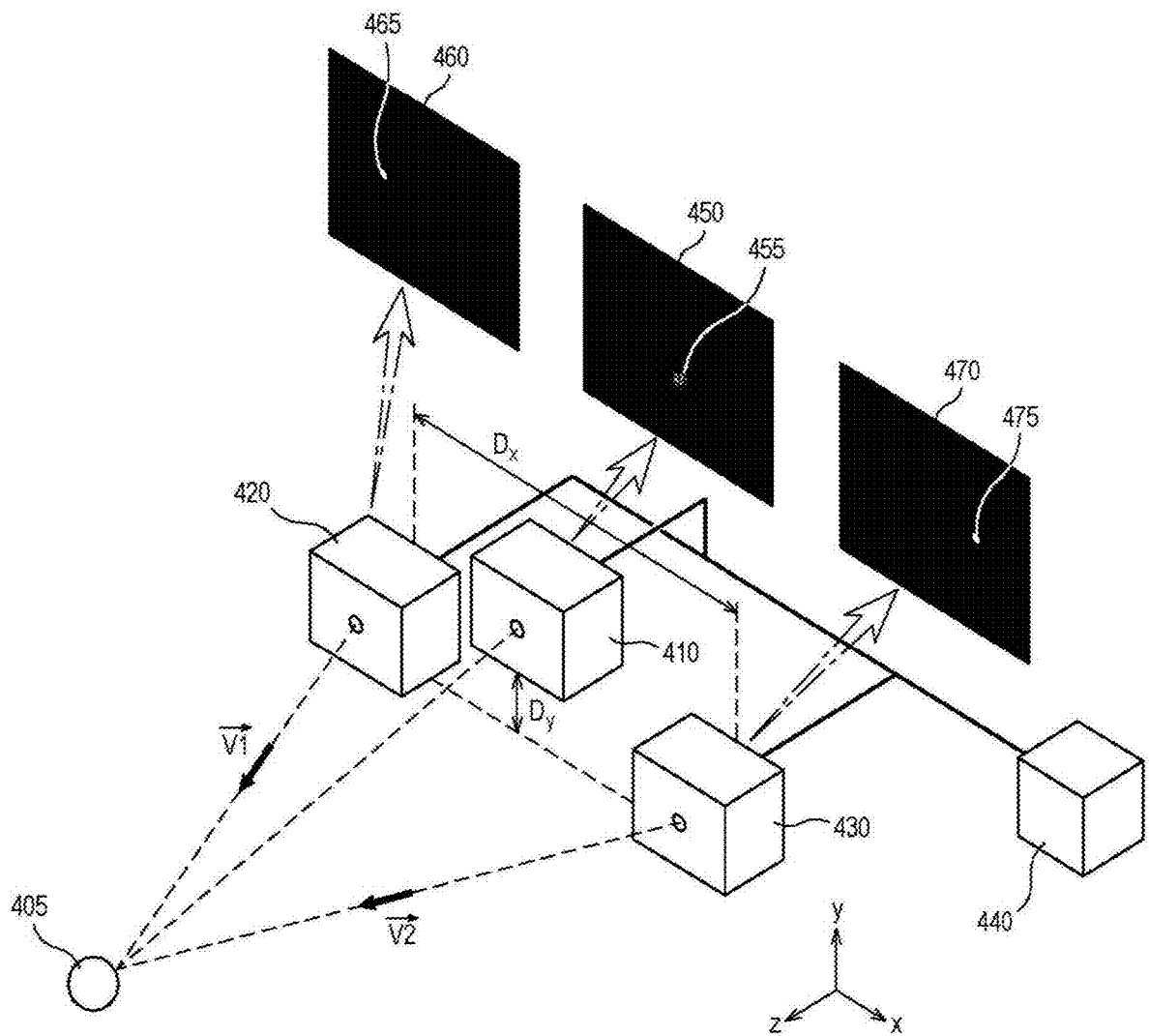
FIG. 5 is a view for illustrating a method of determining a posture and a location of a marker based on three images captured by three image capturing parts of an optical tracking system in accordance with an embodiment of the present disclosure.

FIG. 5 is a view showing a method of determining a posture and a location of a marker 405 based on three images 450, 460 and 470 captured by three image capturing parts 410, 420 and 430 of an optical tracking system according to an embodiment of the present disclosure.

In one embodiment, the marker 405 may include a pattern surface and an aperture. The pattern surface may have a pattern formed thereon and may be at least partially formed into a curved surface. The aperture in which an optical system is formed may be configured so that at least a part of the pattern uniquely appearing depending on the external observation direction of the marker 405 can be identified outside the marker 405.

In one embodiment, the marker 405 is positioned within a field of view of the first to third image capturing parts 410, 420 and 430. Each of the first to third image capturing parts 410, 420 and 430 may capture first to third images 450, 460 and 470 using the outgoing lights coming from the aperture of the marker 405 in different directions. In addition, the optical system of the first image capturing part 410 may constitute an infinite optical system together with the optical system of the marker 405. The first image capturing part 410 may capture a first image 450 at an infinite focal length. The optical system of each of the second and third image capturing parts 420 and 430 may form a focal point at a short distance. The second and third image capturing parts 420 and 430 may capture second and third images 460 and 470 at a short focal length.

The depth of field of the first image 450 may be formed in a predetermined finite range around a position corresponding to an infinite focal length. The depths of field of the second and third images 460 and 470 may be formed in a predetermined finite range around a position corresponding to a short focal length. That is, the depths of field of the second and third images 460 and 470 may be formed in a predetermined finite range around the location of the marker 405.

In one embodiment, the first to third image capturing parts 410, 420 and 430 may be disposed at different positions. In addition, the first to third image capturing parts 410, 420 and 430 may be disposed at predetermined positions so that the optical systems thereof face the marker. For example, the first image capturing part 410 may be disposed between the second and third image capturing parts 420 and 430 in the X axis direction shown in FIG. 5. In addition, at least two of the first to third image capturing parts 410, 420 and 430 may be spaced apart from each other at equal intervals in the X axis direction. For example, the spacing between the first image capturing part 410 and the second image capturing part 420 may be the same as the spacing between the first image capturing part 410 and the third image capturing part 430. In addition, the second and third image capturing parts 420 and 430 may be spaced apart from each other by a predetermined distance $D_x$ in the X axis direction, and may be disposed at predetermined positions so as to have the same height from the ground surface in the Y axis direction.

In one embodiment, the first image capturing part 410 constituting an infinite optical system together with the marker 405 may be disposed at a predetermined position so as to have a different height from the second and third image capturing parts 420 and 430. For example, the first image capturing part 410 may be disposed at a position higher than the second and third image capturing parts 420 and 430 by a predetermined height $D_y$. In the optical tracking system, for example, when a plurality of markers are provided, the precision can be improved by accurately distinguishing the markers. As described above, if the first image capturing part 410 is disposed at a higher position in the Y axis direction than the base line connecting the second and third image capturing parts 420 and 430 in the X axis direction, the algorithm for distinguishing the respective markers may be made more simple. That is, it is possible to reduce the comparison area of stereo correspondence, thereby improving the robustness of correspondence matching.

In one embodiment, the first image capturing part 410 may capture a first image 450 including a part of the pattern surface in a state in which the first image capturing part 410 constitutes an infinite optical system together with the marker 405. Each of the second and third image capturing parts 420 and 430 may capture second and third images 460 and 470, respectively, using the outgoing light emitted from the aperture of the marker 405. Therefore, in the first image 450, a pattern image 455 may be readably captured. In the second and third images 460 and 470, aperture regions 465 and 475 may be clearly captured using the outgoing light emitted through the aperture of the marker.

In one embodiment, the posture tracking part of the processor 440 may track the posture of the target based on the first image 450. Specifically, the posture tracking part may determine the location of a part of the pattern included in the first image 450 in the entire region of the pattern, and may determine the posture of the target based on the location thus determined. In one embodiment, the posture tracking part may read a sub-pattern included in a part of the pattern to determine the location of a part of the pattern. First, in order to extract information for the tracking of the marker from the pattern image captured in the first image 450, the posture tracking part may read sub-patterns from the pattern image. Then, the posture tracking part may calculate the location (coordinates) of each sub-pattern in the entire pattern.

In one embodiment, the location tracking part of the processor 440 may track the location of the target based on the second and third images 460 and 470. Specifically, the location tracking part may determine the reference coordinates of the aperture regions 465 and 475 included in the second and third images 460 and 470, respectively, and may determine the location of the target using the reference coordinates thus determined and the geometrical relationship between the directions $\vec{V1}$ and $\vec{V2}$ in which the second and third image capturing parts 420 and 430 are directed to the marker. The reference coordinates of the aperture regions 465 and 475 may be, for example, the coordinates of the center of the aperture regions 465 and 475.

In one embodiment, the location tracking part may determine the location of the marker using triangulation. For example, the location tracking part may extract reference coordinates of the aperture regions 465 and 475 from the second and third images 460 and 470 captured by the second and third image capturing parts 420 and 430 and then may calculate the location of the marker using the triangulation based on the reference coordinates. More specifically, the location tracking part may determine the location of the marker using the reference coordinates of the aperture regions captured in the respective pattern images, the predetermined distance $D_x$ between the second and third image capturing parts 420 and 430, and the geometric relationship between the directions $\vec{V1}$ and $\vec{V2}$ in which the second and third image capturing parts 420 and 430 located at different positions look at the marker.

FIG. 6 is a view illustrating the appearance of the first image 450 captured by the first image capturing part 410 shown in FIG. 5.

The first image 450 may be an image captured by the first image capturing part 410 that constitutes an infinite optical system together with the marker 405. The first image 450 may include a pattern image 455 including a portion of the pattern 255 shown in FIG. 3 and having a focal point formed in the portion of the pattern 255. When the first image capturing part 410 is disposed between the second and third image capturing parts 420 and 430 in the X axis direction shown in FIG. 5, the pattern image 455 may be disposed in the first image 450 between the positions at which the aperture regions 465 and 475 of the second and third imagers 460 and 470 are formed.

The location of the pattern image 455 in the first image 450 can be defined by the distance X1 in the horizontal direction and the distance Y1 in the vertical direction. The distance X1 in the horizontal direction may mean the shortest distance between the left end of the first image 450 and the pattern image 455. The distance Y1 in the vertical direction may mean the shortest distance between the upper end of the first image 450 and the pattern image 455. In addition, when the first image capturing part 410 is disposed at a different height from the ground surface than the second and third image capturing parts 420 and 430, the distance Y1 in the vertical direction of the pattern image 455 may differ from the vertical distance of the aperture regions 465 and 475.

In the first image 450, the boundary portion 456 surrounding the pattern image 455 may correspond to the aperture of the marker. The outgoing light emitted through the edge of the aperture of the marker may be captured by a camera in a blurred form due to diffraction, internal reflection, aperture vignetting, focal depth or the like. Since the boundary portion 456 is formed in a blurred state, the boundary portion 456 may not be distinguished from the peripheral portion 457. Further, the peripheral portion 457 is a portion that is relatively darker than the pattern image 455 and may be corrected in an imageless form (for example, a black-out state) in an image processing process. Therefore, when the location tracking part of the processor 440 measures the reference coordinates of the pattern image 455, an error may occur due to the phenomenon that the boundary portion 456 is captured in a blurred state. Thus, the location tracking part may track the location of the marker based on the reference coordinates of the aperture regions 465 and 475 clearly captured in the second and third images 460 and 470.

In one embodiment, the posture tracking part of the processor 440 shown in FIG. can read the pattern image 455 from the first image 450. Thus, the posture tracking part may determine the posture of the marker using the pattern image 455 and may track the posture of the target using the relative relationship between the marker and the target. In one embodiment, the processor 440 may extract at least one sub-pattern from the pattern image 455 through a pattern window, may calculate a location of the sub-pattern in the entire pattern, and may determine the posture of the marker based thereon. For example, the processor 440 may calculate the posture of the marker based on one sub-pattern.

Figure 7:
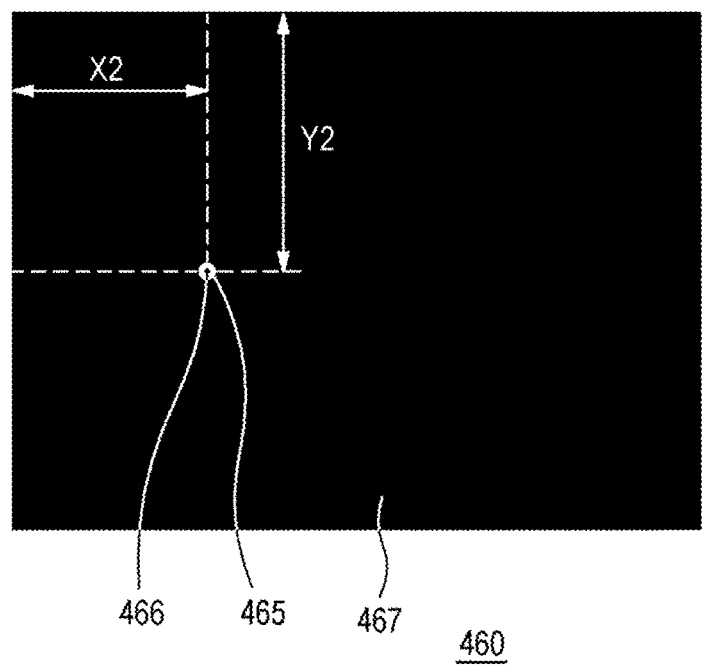
FIG. 7 is a view for illustrating an exemplary shape of a second image captured by a second image capturing part shown in FIG. 5.
Figure 8:
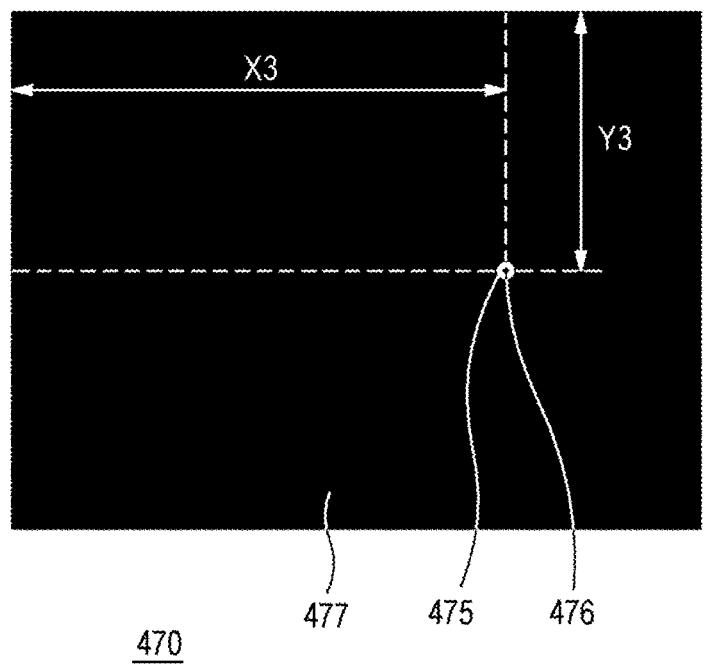
FIG. 8 is a view for illustrating an exemplary shape of a third image captured by a third image capturing part shown in FIG. 5.

FIG. 7 is a view illustrating the appearance of the second image 460 captured by the second image capturing part 420 shown in FIG. 5. FIG. 8 is a view illustrating the appearance of the third image 470 captured by the third image capturing part 430 shown in FIG. 5.

The second and third image capturing parts 420 and 430 are configured to capture images at a short focal length without constituting an infinite optical system together with the marker. Thus, the outgoing light may be captured as an image in in a state in which the pattern surface is not identifiable. That is, the aperture region 465 or 475 of the marker may have a circular disk shape and may be captured as an image brighter than the peripheral portion 467 or 477. In another embodiment, if the aperture of the marker has a shape other than the circular shape (e.g., a polygonal shape), the aperture region 465 or 475 of the marker may have a shape corresponding to the shape other than the circular shape.

In the second and third images 460 and 470, the aperture regions 465 and 475 of the markers may be captured as images so as to be clearly distinguishable from the peripheral portions 467 and 477. Thus, the locations of the aperture regions 465 and 475 of the markers may be identified in the second and third images 460 and 470. In one embodiment, the location tracking part of the processor 440 may determine the boundaries distinguished from the peripheral portions 467 and 477 surrounding the aperture regions 465 and 475 of the markers, and may determine the reference coordinates 466 and 476 of the aperture regions 465 and 475 of the markers in the second and third images 460 and 470 based thereon. For example, the reference coordinates 466 and 476 may correspond to the coordinates of the center of the aperture regions 465 and 475 of the markers.

The locations of the aperture regions 465 and 475 of the respective markers in the second and third images 460 and 470 may be defined by the distances X2 and X3 in the horizontal direction and the distances Y2 and Y3 in the vertical direction. The distances X2 and X3 in the horizontal direction may mean the shortest distance between the left ends of the second and third images 460 and 470 and the aperture regions 465 and 475 of the markers. The distances Y2 and Y3 may mean the shortest distance between the upper ends of the second and third images 460 and 470 and the aperture regions 465 and 475 of the markers.

Referring to FIG. 5, the second image capturing part 420 may be disposed at a position shifted in the X axis negative direction relative to the first image capturing part 410. Therefore, the distance X2 in the horizontal direction of the aperture region 465 of the second image 460 may be smaller than the distance X1 in the horizontal direction of the pattern image 455 of the first image 450. In addition, the second image capturing part 420 can be disposed at a lower or higher position from the ground surface than the first image capturing part 410. Therefore, the distance H2 in the vertical direction of the aperture region 465 of the second image 460 may be different from the distance H1 in the vertical direction of the pattern image 455 of the first image 450.

The third image capturing part 430 may be disposed at a position shifted in the X axis positive direction relative to the first image capturing part 410. Thus, the distance X3 in the horizontal direction of the aperture region 455 of the third image 470 may be larger than the distance X1 in the horizontal direction of the pattern image 455 of the first image 450. Furthermore, the third image capturing part 430 may be disposed at a lower or higher position from the ground surface than the first image capturing part 410. Thus, the distance Y3 in the vertical direction of the aperture region 455 of the third image 470 may be different from the distance Y1 in the vertical direction of the pattern image 455 of the first image 450. When the second and third image capturing parts 420 and 430 are disposed at the same height from the ground surface, the distances Y2 and Y3 in the vertical direction of the aperture regions 465 and 475 in the second and third images 460 and 470 may be equal to each other.

Since the second and third image capturing parts 420 and 430 and the marker form a substantially triangular shape, the distances X2 and X3 in the horizontal direction of the aperture regions 465 and 475 of the second and third images 460 and 470 may be different in size from each another. The distances X2 and X3 in the horizontal direction may show a disparity at all times. For example, referring to FIGS. 7 and 8, the difference between the distance X2 in the horizontal direction and the distance X3 in the horizontal direction may indicate a positive value. In addition, the second and third image capturing parts 420 and 430 may constitute a stereoscopic part due to the difference. Referring to FIG. 5, the second and third image capturing parts 420 and 430 may be spaced apart by a predetermined distance $D_x$. In the course of using triangulation, the location tracking part of the processor 440 may determine the location of the marker based on the aforementioned difference and the predetermined distance $D_x$.

In one embodiment, referring to FIG. 5, the location tracking part of the processor 440 may determine the reference coordinates 466 and 476 of the aperture regions 465 and 475 of the markers included in the second and third images 460 and 470, respectively, and may determine the location of the target using the reference coordinates 466 and 476 thus determined and the geometrical relationship between the directions $\vec{V1}$ and $\vec{V2}$ in which the second and third image capturing parts 420 and 430 are directed to the marker.

Figure 9:
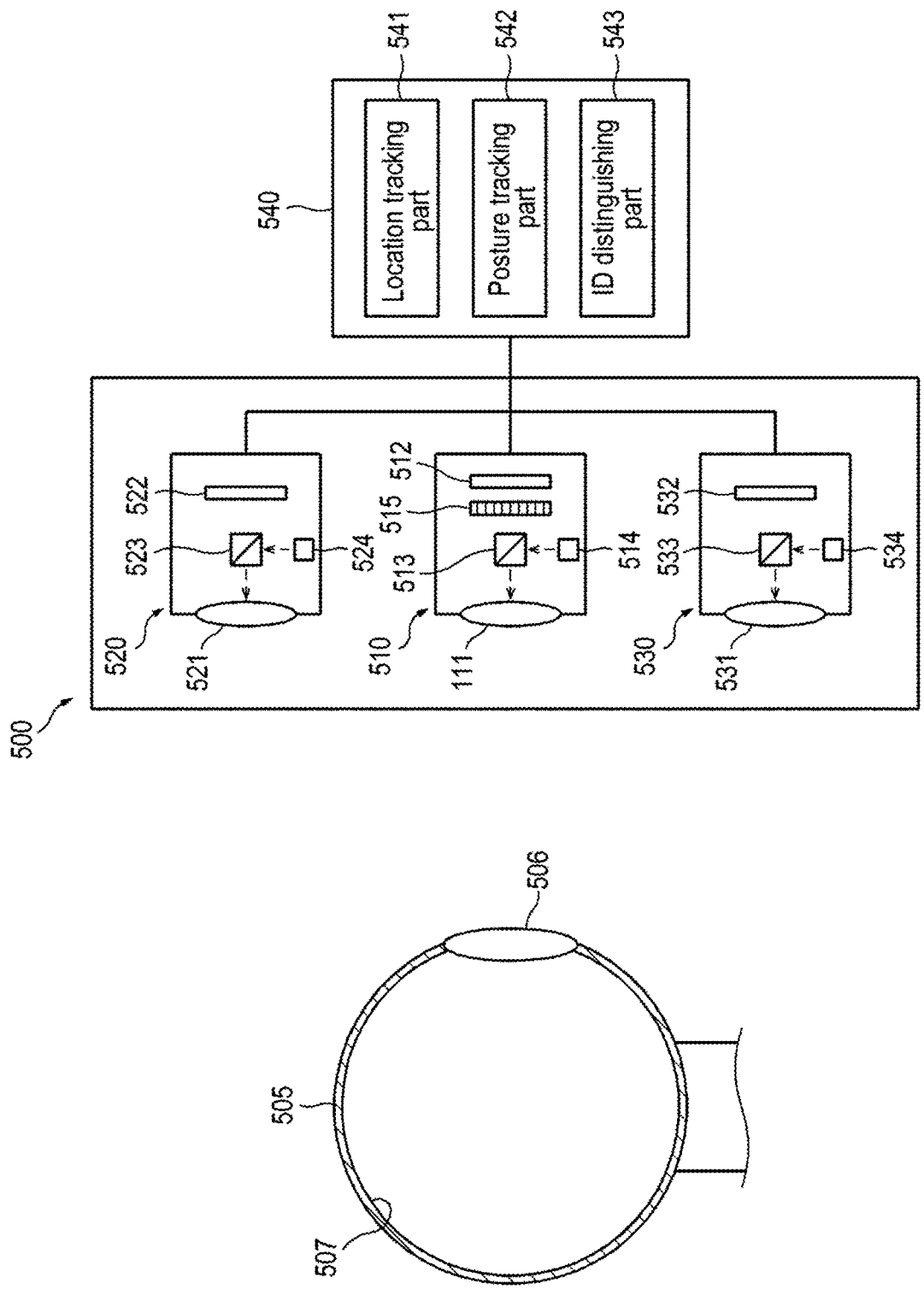
FIG. 9 is a view illustrating an example in which one image capturing part of an optical tracking system according to an embodiment of the present disclosure is formed of a light field camera.
Figure 10:
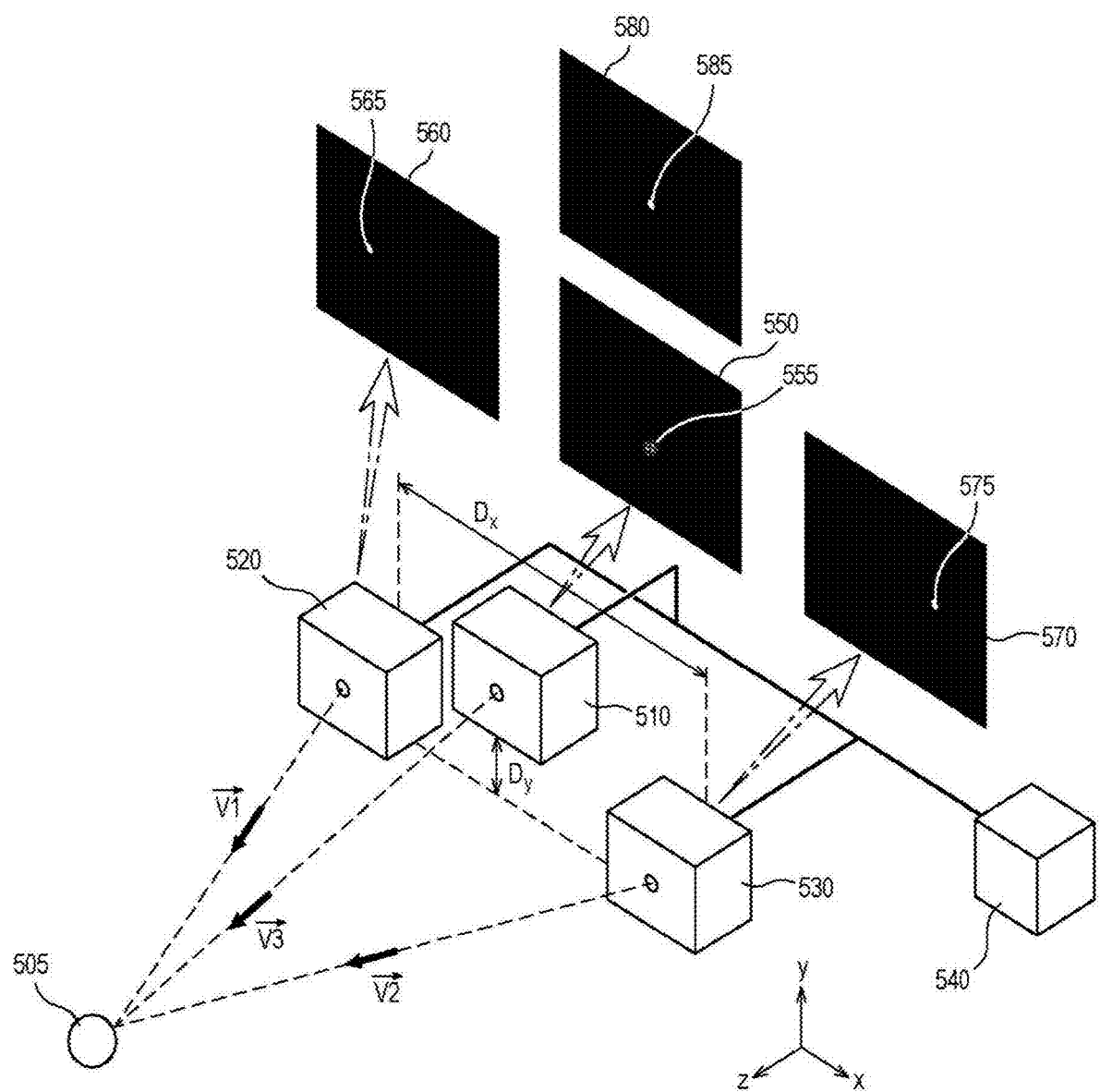
FIG. 10 is a view for illustrating a method of determining a posture and a location of a marker based on the images captured by the three image capturing parts of the optical tracking system shown in FIG. 9.

FIG. 9 is a view illustrating an example in which one image capturing part of an optical tracking system according to an embodiment of the present disclosure is formed of a light field camera. FIG. 10 is a view for illustrating a method of determining a posture and a location of a marker based on the images captured by the three image capturing parts of the optical tracking system shown in FIG. 9. Descriptions of the contents overlapping with those described in the above embodiment will be omitted.

In one embodiment, the optical tracking system may include a marker 505 having a pattern surface 507 and an optical system 506 configured so that the pattern surface 507 is visible through the optical system 506, an image capturing device 500 including a first image capturing part 510, a second image capturing part 520 and a third image capturing part 530, and a processor 540 including a location tracking part 541, a posture tracking part 542 and an ID distinguishing part 543. The first image capturing part 510 may have a structure of a light field camera. The light field camera may be configured to post-determine a depth of field after capturing an image of a subject and to combine images having different depths of field. Thus, the image sensor of the light field camera may have post-determined variable depths of field. The light field image generated by the light field camera may include a plurality of unit images for storing the color information and the direction information of light together.

The first image capturing part 510 having a structure of a light field camera may include a lens 511, an image sensor 512, and a lens array 515 disposed between the lens 511 and the image sensor 512 and provided with a plurality of micro-lenses. The image sensor 512 may be divided into regions corresponding to the respective micro-lenses. The light field camera implemented by the first image capturing part 510 may transmit to the processor 540 a first image 550, which is obtained by synthesizing images with depths of field ranging from a long distance to an infinite distance, so as to clearly capture an image of a part of a pattern surface 507 located at an infinite position.

In another embodiment, the first image capturing part 510 may perform a refocusing process using a plurality of unit images. In the refocusing process, an image having a desired depth may be newly extracted by combining the desired depth of field among the pixels of the light field image and the color information of the pixels corresponding to the inversely calculated light path or direction. This makes it possible to generate a first image 550 from which a pattern image is clearly identifiable.

The second and third image capturing parts 520 and 530 may capture a second image 560 and a third image 570 using the outgoing lights emitted from the optical system 506 of the marker 505 in different directions. The lights reflected from the marker 505 may pass through the lenses 521 and 532 of the second and third image capturing parts 520 and 530 and may be captured in the image sensors 522 and 532. The lenses 521 and 531 of the second and third image capturing parts 520 and 530 and the optical system 506 of the marker 505 may not constitute an infinite optical system. In this case, a part of the pattern surface 507 may not be captured in a readable form in the second and third images 560 and 570. Thus, the locations of the aperture regions 565 and 575 may be clearly identified in the second and third images 560 and 570.

In one embodiment, the posture tracking part 542 of the processor 540 may track the posture of the target based on the first image 550. Specifically, the posture tracking part 542 may determine the location of a part of the pattern included in the first image 550 in the entire region of the pattern, and may determine the posture of the target based on the location thus determined.

The location tracking part 541 of the processor 540 may determine the location of the marker using triangulation. The first image capturing part 510 having a structure of a light field camera may be configured to extract a fourth image 580 captured at a short focal length to include an outgoing light image, from the captured light field image. In the fourth image 580, the aperture region 585 may be clearly captured so that the location of the aperture region 585 can be clearly identified.

In one embodiment, the location tracking part 541 may extract the reference coordinates of the aperture regions 565, 575 and 585 from the second to fourth images 560, 570 and 580 captured by the first to third image capturing parts 510, 520 and 530 and then may calculate the location of the marker using triangulation based on the three reference coordinates. More specifically, the location tracking part 541 may calculate the location of the marker using the three reference coordinates, the predetermined distances between the first to third image capturing parts 510, 520 and 530, and the geometrical relationship between the directions $\vec{V1}$, $\vec{V2}$ and $\vec{V3}$ in which the first to third image capturing parts 510, 520 and 530 located at different positions look at the marker.

Figure 11:
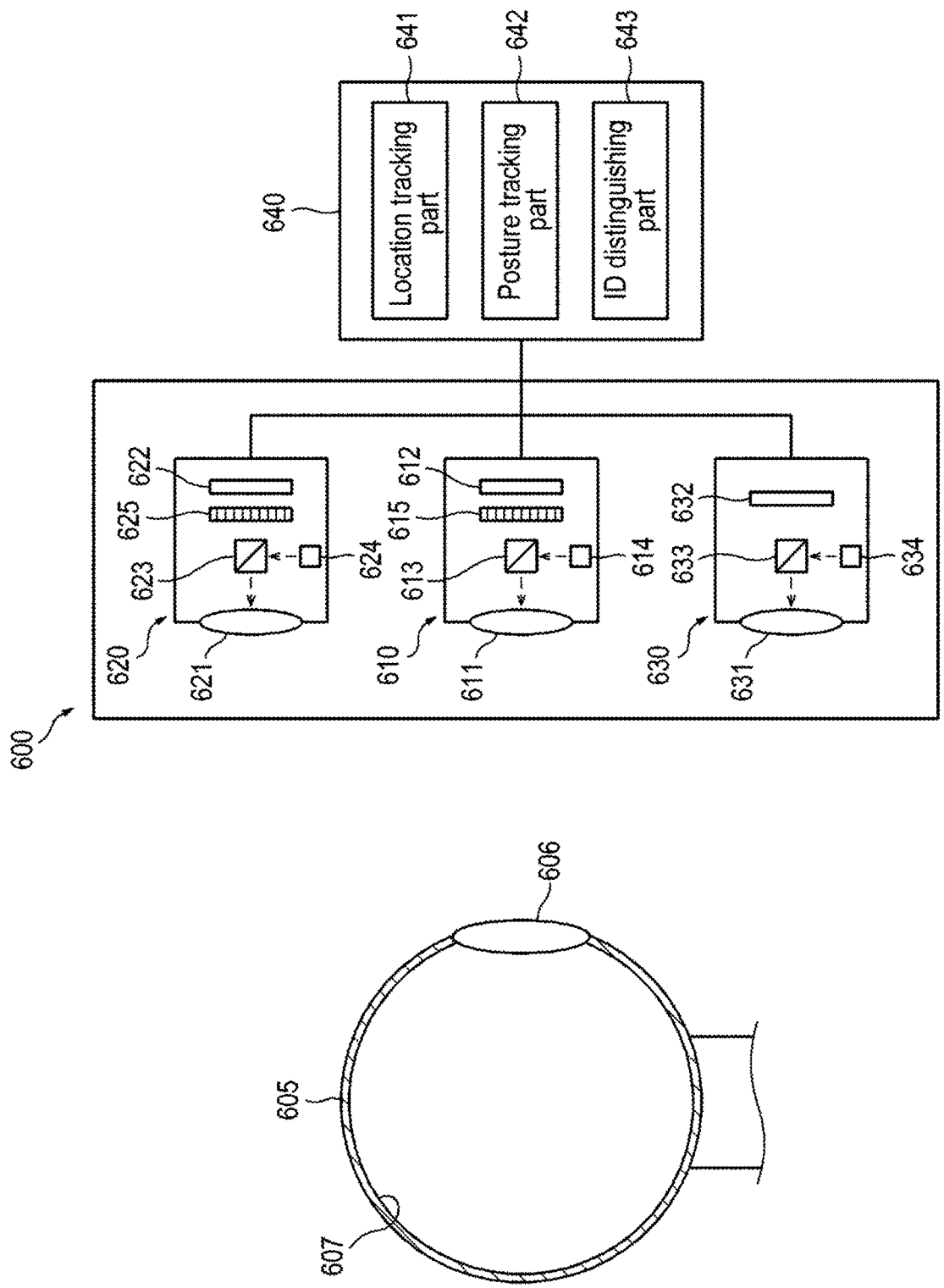
FIG. 11 is a view showing an example in which two image capturing parts of an optical tracking system according to an embodiment of the present disclosure is formed of light field cameras.
Figure 12:
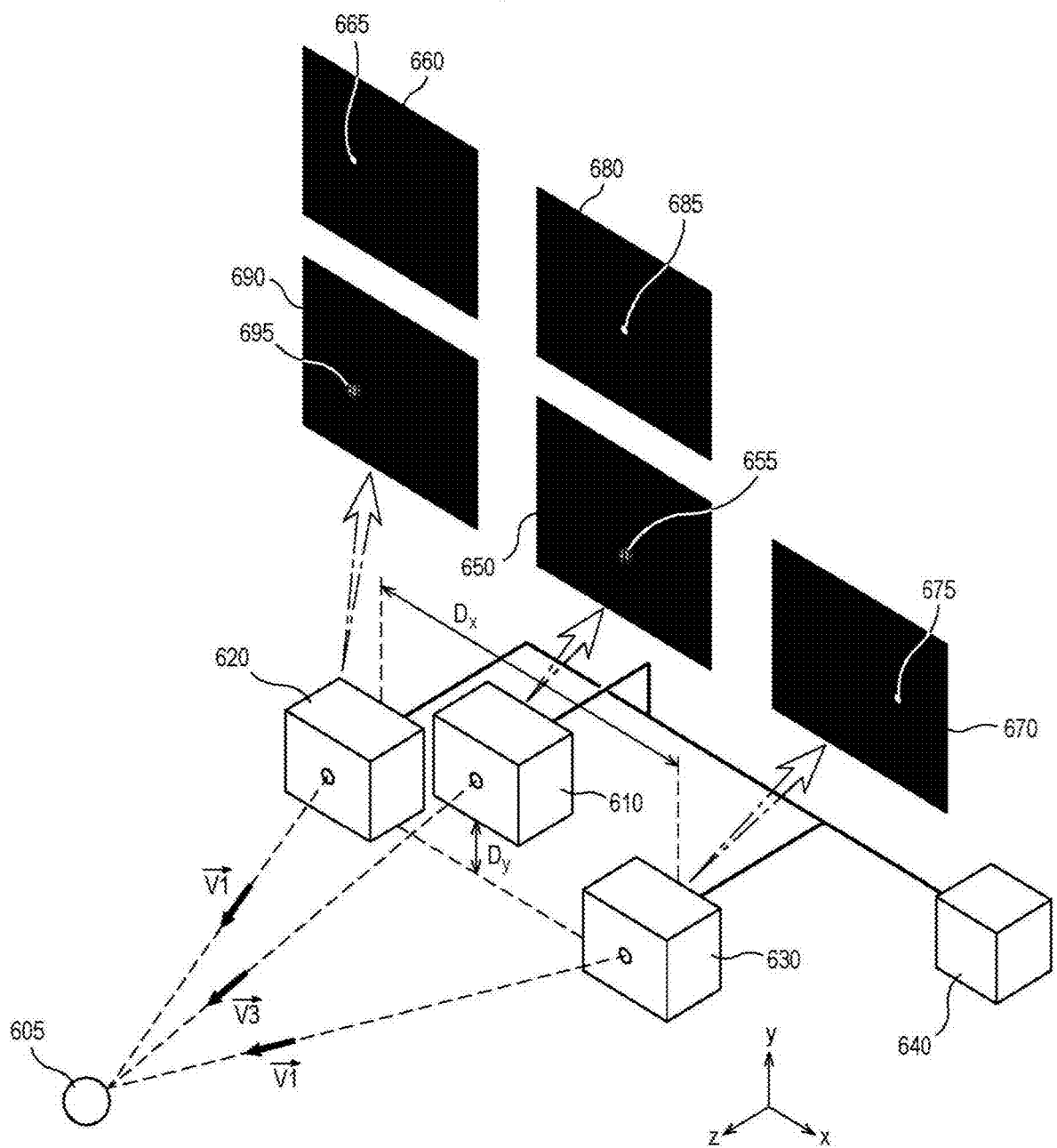
FIG. 12 is a view for illustrating a method of determining a posture and a location of a marker based on the images captured by the three image capturing parts of the optical tracking system shown in FIG. 11.

FIG. 11 is a view showing an example in which two image capturing parts of an optical tracking system according to an embodiment of the present disclosure is formed of light field cameras. FIG. 12 is a view for illustrating a method of determining a posture and a location of a marker based on the images captured by the three image capturing parts of the optical tracking system shown in FIG. 11. Descriptions of the contents overlapping with those described in the above embodiment will be omitted.

In one embodiment, the optical tracking system may include a marker 605 having a pattern surface 607 and an optical system 606 configured so that the pattern surface 607 is visible through the optical system 606, an image capturing device 600 including a first image capturing part 610, a second image capturing part 620 and a third image capturing part 630, and a processor 640 including a location tracking part 641, a posture tracking part 642 and an ID distinguishing part 643. Each of the first and second image capturing parts 610 and 620 may have a structure of a light field camera.

Each of the first and second image capturing parts 610 and 620 having a structure of a light field camera may include a lens 611 or 621, an image sensor 612 or 622, and a lens array 615 or 625 disposed between the lens 611 or 621 and the image sensor 612 or 622 and provided with a plurality of micro-lenses. The image sensor 612 or 622 may be divided into regions corresponding to the respective micro-lenses. The first and second image capturing parts 610 and 620 may transmit to the processor 640 a first image 650 and/or a fifth image 690, which is obtained by synthesizing images with depths of field ranging from a long distance to an infinite distance, so as to clearly capture an image of a part of a pattern surface 607 located at an infinite position.

The second and third image capturing parts 620 and 630 may capture a second image 660 and a third image 670 using the outgoing lights emitted in different directions from the aperture 606 of the marker 605. In one embodiment, the second image capturing part 620 may transmit to the processor 640 the second image 660 extracted from the captured light field image so as to be captured at a short focal length. The light reflected from the marker 605 may pass through the lenses 621 and 632 of the second and third image capturing parts 620 and 630 and may be captured in the image sensors 622 and 632. The locations of the aperture regions 665 and 675 may be clearly identified in the second and third images 660 and 670.

In one embodiment, the posture tracking part 642 of the processor 640 may track the posture of the target based on the pattern image 655 captured in the first image 650. In another embodiment, the posture tracking part 642 may track the posture of the target based on the pattern image 695 captured in the fifth image 690. Specifically, the posture tracking part 642 may determine the location of a part of the pattern included in the first image 650 or the fifth image 690 in the entire region of the pattern, and may determine the posture of the target based on the location thus determined. In a further embodiment, the posture tracking part 642 may track the posture of the target based on an average value of the posture of the target determined based on the first image 650 and the posture of the target determined based on the fifth image 690.

In one embodiment, the location tracking part 641 of the processor 640 may determine the location of the marker using triangulation. The first image capturing part 610 having a structure of a light field camera may be configured to extract a fourth image 680 captured at a short focal length from a captured light field image so as to include an outgoing light image. In the fourth image 680, the aperture region 685 may be clearly captured so that the position of the aperture region 685 can be clearly identified. For example, the location tracking part 641 may extract the reference coordinates of the aperture regions 665, 675 and 685 from the second to fourth images 660, 670 and 680 captured by the first to third image capturing parts 610, 620 and 630 and then may calculate the location of the marker using triangulation based on the three reference coordinates. More specifically, the location tracking part 641 may calculate the location of the marker using the three reference coordinates, the predetermined distances between the first to third image capturing parts 610, 620 and 630, and the geometrical relationship between the directions $\vec{V1}$, $\vec{V2}$ and $\vec{V3}$ in which the first to third image capturing parts 610, 620 and 630 located at different positions look at the marker.

<Marker Tracking Method>

FIG. 14 is a flowchart showing an optical tracking method (S1200) according to another embodiment of the present disclosure. Hereinafter, the respective steps of a marker tracking method will be described in more detail with reference to the drawings.

A marker including a pattern surface and an aperture may be attached to a target. Referring to FIGS. 1 and 2, the marker 10 may be attached to an end portion of the surgical instrument 20. Further, the aperture 13 of the marker 10 may be arranged so as to face the image capturing device 100 at all times.

First, referring to FIG. 5, in step S1210, the posture of the marker may be determined based on the first image 450 in which a part of the pattern surface viewed through the aperture is captured as a pattern image at an infinite focal length. In the next step S1220, the location of the marker may be determined based on the second and third images 460 and 470 in which the outgoing lights emitted in different directions through the aperture are captured as outgoing light images at a focal length shorter than the infinite focal length.

In the optical tracking method (S1200), the processor 440 can simultaneously determine the posture of the marker and the location of the marker. In another embodiment, the processor 440 may determine the location of the marker before determining the posture of the marker, or may determine the location of the marker after determining the posture of the marker.

Figure 15:
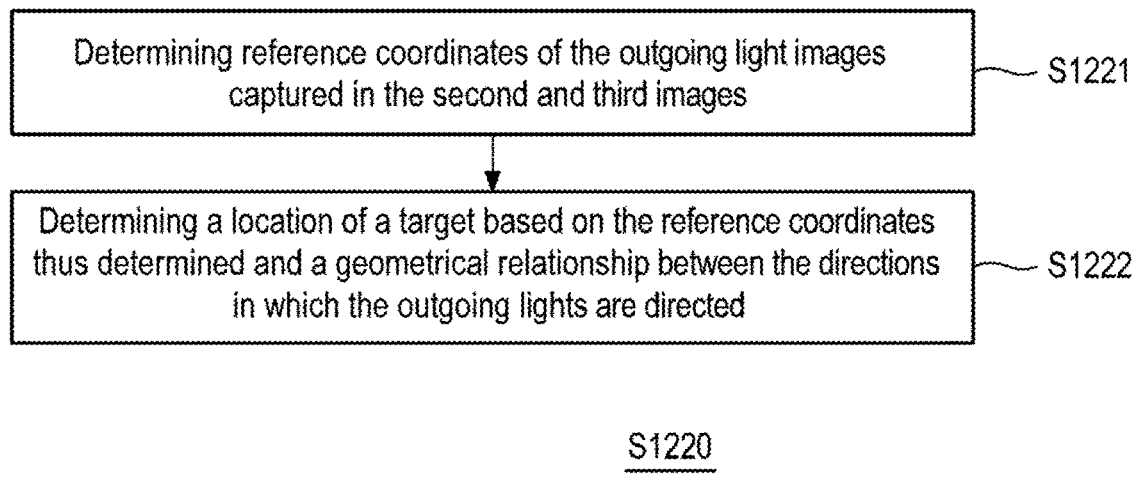
FIG. 15 is a flowchart showing a step of determining a location of a marker in the optical tracking method shown in FIG. 13.

FIG. 14 is a flowchart showing a step S1210 of determining a posture of a marker in the optical tracking method shown in FIG. 13. FIG. 15 is a flowchart showing a step S1220 of determining a location of a marker in the optical tracking method shown in FIG. 13.

In one embodiment, the step S1210 may be performed as follows. Referring to FIG. 5, first, the location of the pattern image 455 included in the first image 450 in the entire region of the pattern surface may be determined (S1211). Next, the posture of the target may be determined based on the location thus determined (S1212).

In one embodiment, the step S1220 may be performed as follows. First, the reference coordinates of the outgoing light images formed in the second and third images 460 and 470 may be respectively determined (S1221), and the location of the target may be determined using the reference coordinates thus determined and the geometrical relationship between the directions in which the outgoing lights are directed (S1222).

In one embodiment, the processor 440 may process and determine the location and the posture of the marker in parallel. That is, since the first to third images 450, 460 and 470 are simultaneously captured, the processor 440 may simultaneously determine the posture and the location of the target by processing the first to third images 450, 460 and 470 at a time.

Figure 16:
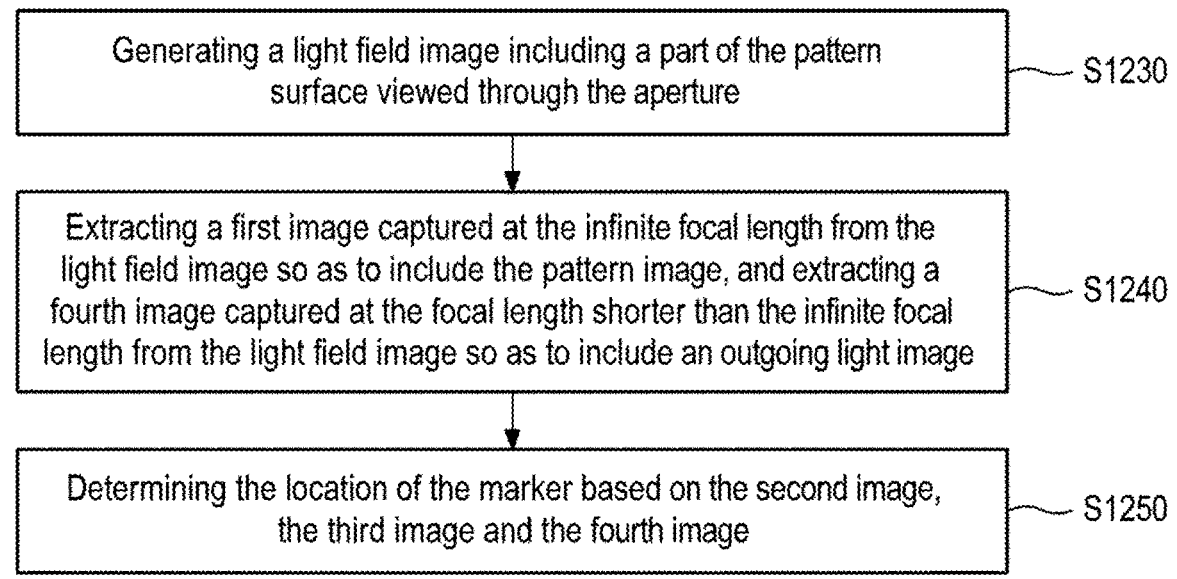
FIG. 16 is a flowchart showing an example in which a light field image is used in the optical tracking method shown in FIG. 13.

FIG. 16 is a flowchart showing an example in which a light field image is used in the optical tracking method shown in FIG. 13.

Referring to FIG. 10, first, a light field image including a part of a pattern surface viewed through an aperture may be generated (S1230). Next, a first image 550 captured at an infinite focal length and including a pattern image may be extracted from the light field image, and a fourth image 580 captured at a short focal length and including an outgoing light image may be extracted from the light field image (S1240). Next, the location of the marker may be determined based on the second image, the third image and the fourth image 560, 570 and 580 (S1250).

In step S1250, the processor may determine the location of the marker based on triangulation using the reference coordinates of the outgoing light images included in the three images and the geometric relationship between the directions in which the image capturing parts look at the marker. In the above embodiments, the location of the marker is determined using the triangulation. However, the present disclosure is not limited thereto. Methods other than the triangulation may be used.

Although the method has been described through specific embodiments, the method may also be embodied as computer-readable codes in a computer-readable recording medium. The computer-readable recording medium includes all kinds of recording devices that store data that can be read by a computer system. Examples of the computer-readable recording medium may include memory devices such as a CD-ROM, a USB and the like. In addition, the computer-readable recording medium may be distributed to computer systems that are connected through a network, and a computer-readable code may be stored and executed in a distributed manner. In addition, functional programs, codes, and code segments for implementing the embodiments above may be easily inferred by the programmers who are skilled in the art.

Although the present disclosure has been described in relation to some embodiments, it should be noted that there may be various modifications and changes without departing from the spirit and scope of the present disclosure, which can be understood by those skilled in the art. In addition, such modifications and changes should be construed to belong to the scope of the claims appended herein.

What is claimed is:

1. An optical tracking system for tracking a location and a posture of a marker which is attachable to a target and configured so that a pattern surface formed inside the marker is visible through an optical system formed in an aperture, comprising:
    a first image capturing part configured to capture a first image including a part of the pattern surface at an infinite focal length;
    a second image capturing part configured to capture a second image including an outgoing light image of an outgoing light emitted through the aperture in a first direction at a focal length shorter than the infinite focal length;
    a third image capturing part configured to capture a third image including an outgoing light image of an outgoing light emitted through the aperture in a second direction differing from the first direction at the focal length shorter than the infinite focal length; and
    a processor configured to determine the posture of the marker based on the first image and to determine the location of the marker based on the second image and the third image.

2. The system of claim 1, wherein the processor is configured to:
    determine the posture of the marker based on the first image in which the part of the pattern surface visible through the aperture is captured at the infinite focal length; and
    determine the location of the marker based on the second and third images in which the outgoing lights emitted through the aperture in different directions are respectively captured at the focal length shorter than the infinite focal length.

3. The system of claim 1, wherein the first image includes a pattern image captured at the infinite focal length so that a part of the pattern surface is identifiably captured in the pattern image, and the second and third images respectively include outgoing light images captured at a focal length of a predetermined range including a location of the target so that the outgoing lights directed in different directions are captured in the outgoing light images.

4. The system of claim 3, wherein the processor is configured to determine a location of the pattern image from an entire region of the pattern surface and to determine a posture of the target based on the determined location of the pattern image.

5. The system of claim 3, wherein the processor is configured to determine reference coordinates of the outgoing light images captured in the second and third images and to determine a location of the target based on the determined reference coordinates.

6. The system of claim 5, wherein the processor is configured to determine the location of the marker on a three-dimensional space based on a disparity between the reference coordinates of the outgoing light images captured in the second and third images.

7. The system of claim 1,
wherein the first image capturing part consists of a light field camera for generating a light field image,
wherein the first image capturing part is configured to extract the first image captured at the infinite focal length from the light field image so as to include a pattern image.

8. The system of claim 7, wherein the first image capturing part is configured to extract a fourth image captured at the focal length shorter than the infinite focal length from the light field image so as to include an outgoing light image, and
the processor is configured to determine the location of the marker based on the second image, the third image and the fourth image.

9. The system of claim 1, wherein each of the first image capturing part and the second image capturing part consists of a light field camera for generating a light field image,
the first image capturing part is configured to extract a fourth image captured at the focal length shorter than the infinite focal length from the light field image,
the second image capturing part is configured to extract a second image captured at the focal length shorter than the infinite focal length from the light field image, and
the processor is configured to determine the location of the marker based on the second image, the third image and the fourth image.

10. The system of claim 1, wherein the first image capturing part is disposed at a height different from a height of the second and third image capturing parts from a ground surface, and is disposed between the second and third image capturing parts in a plan view.

11. An optical tracking method for tracking a location and a posture of a marker which is attachable to a target and configured so that a pattern surface formed inside the marker is visible through an optical system formed in an aperture, comprising:
capturing a first image including a part of the pattern surface at an infinite focal length by a first image capturing part;
capturing a second image including an outgoing light image of an outgoing light emitted through the aperture in a first direction at a focal length shorter than the infinite focal length by a second image capturing part;
capturing a third image including an outgoing light image of an outgoing light emitted through the aperture in a second direction differing from the first direction at the focal length shorter than the infinite focal length by a third image capturing part;
determining the posture of the marker based on the first image in which a part of the pattern surface viewed through the aperture is captured as a pattern image at the infinite focal length by a processor; and
determining the location of the marker based on the second image and the third image in which outgoing lights emitted through the aperture in different directions are captured as outgoing light images at the focal length shorter than the infinite focal length by the processor.

12. The method of claim 11, wherein the determining the posture of the marker includes:
determining a location of the pattern image included in the first image in an entire region of the pattern surface; and
determining a posture of the target based on the location of the pattern image thus determined.

13. The method of claim 11, wherein the determining the location of the marker includes:
determining reference coordinates of the outgoing light images captured in the second and third images; and
determining a location of the target based on the reference coordinates thus determined and a geometrical relationship between the directions in which the outgoing lights are directed.

14. The method of claim 11, further comprising:
generating a light field image including the part of the pattern surface viewed through the aperture;
extracting the first image captured at the infinite focal length from the light field image so as to include the pattern image;
extracting a fourth image captured at the focal length shorter than the infinite focal length from the light field image so as to include an outgoing light image; and
determining the location of the marker based on the second image, the third image and the fourth image.

* * * * *